United States Patent
Ketels et al.

(10) Patent No.: US 12,017,589 B2
(45) Date of Patent: Jun. 25, 2024

(54) VEHICLE INTERIOR ASSEMBLY WITH FOLDABLE DEVICE HOLDER

(71) Applicant: Faurecia Interior Systems, Inc., Auburn Hills, MI (US)

(72) Inventors: Cedric Ketels, Mountain View, CA (US); Thomas Dessapt, Auburn Hills, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 318 days.

(21) Appl. No.: 17/380,764

(22) Filed: Jul. 20, 2021

(65) Prior Publication Data

US 2023/0021943 A1 Jan. 26, 2023

(51) Int. Cl.
| B60R 11/00 | (2006.01) |
| B60N 3/10 | (2006.01) |
| B60R 7/04 | (2006.01) |

(52) U.S. Cl.
CPC .............. B60R 11/00 (2013.01); B60N 3/103 (2013.01)

(58) Field of Classification Search
CPC ... B60R 11/00; B60R 7/04; B60R 2011/0017; B60R 3/10; B60N 3/103
USPC ............. 224/571; 296/24.1; 248/108, 43, 44
See application file for complete search history.

(56) References Cited

U.S. PATENT DOCUMENTS

| 2,587,316 | A | * | 2/1952 | Henry | B42D 3/16 |
| | | | | | 206/45.24 |
| 5,067,682 | A | * | 11/1991 | Figaro | A47B 23/043 |
| | | | | | 248/458 |
| 6,032,587 | A | * | 3/2000 | Salenbauch | B60N 3/002 |
| | | | | | 108/44 |
| 7,073,449 | B2 | * | 7/2006 | Pipkin | B64D 11/0638 |
| | | | | | 108/9 |
| 8,424,829 | B2 | * | 4/2013 | Lu | F16M 11/38 |
| | | | | | 248/152 |
| D708,838 | S | * | 7/2014 | Lee | D14/440 |
| 8,887,903 | B2 | * | 11/2014 | Diebel | H04M 1/04 |
| | | | | | 206/45.24 |
| 8,915,357 | B2 | * | 12/2014 | Mecchella | A45C 11/00 |
| | | | | | 206/320 |
| 8,919,544 | B2 | * | 12/2014 | Lee | G06F 1/1656 |
| | | | | | 206/45.24 |
| 9,033,147 | B2 | * | 5/2015 | Lee | A45C 11/00 |
| | | | | | 206/320 |

(Continued)

FOREIGN PATENT DOCUMENTS

DE 102018003962 A1 11/2019

*Primary Examiner* — Nathan J Newhouse
*Assistant Examiner* — Lester L Vanterpool
(74) *Attorney, Agent, or Firm* — Reising Ethington P.C.

(57) ABSTRACT

A vehicle interior assembly includes a foldable layer that is convertible between an unfolded condition, in which it provides the working surface of a tabletop, and a folded condition, in which it supports one or more portable electronic devices in a tilted position. When deployed as part of a device holder, the foldable layer uncovers a portion of a base layer that includes edge supports for the mobile device(s). A plurality of polygonal segments interconnected by a corresponding plurality of hinge joints permits the foldable layer to change from a flat sheet to a hollow, self-supporting three-dimensional structure with a clean angular appearance in an origami-like manner that does not require complex linkages or mechanisms for the conversion.

20 Claims, 3 Drawing Sheets

(56) References Cited

U.S. PATENT DOCUMENTS

| | | | | |
|---|---|---|---|---|
| 9,049,911 | B1* | 6/2015 | Wood | A45C 11/00 |
| 9,095,061 | B2* | 7/2015 | Coberly | F16M 11/38 |
| 9,095,194 | B2* | 8/2015 | Hassett | G06F 1/1626 |
| 9,192,235 | B2* | 11/2015 | Horowitz | A47C 4/286 |
| 9,226,559 | B1* | 1/2016 | Diebel | H05K 5/03 |
| D772,234 | S* | 11/2016 | Massucco | D14/440 |
| 9,872,560 | B2* | 1/2018 | McGrane | A47B 23/04 |
| 9,896,011 | B2 | 2/2018 | Kong et al. | |
| 10,086,732 | B2 | 10/2018 | Welch et al. | |
| 10,457,171 | B2* | 10/2019 | Line | B60N 2/01 |
| 10,967,807 | B1* | 4/2021 | Hessheimer | B60R 11/0241 |
| 11,439,233 | B2* | 9/2022 | Lin | A47B 97/04 |
| 2003/0122392 | A1* | 7/2003 | Larsen | B60N 2/793 |
| | | | | 296/37.8 |
| 2004/0134946 | A1* | 7/2004 | Gammon | B60R 7/02 |
| | | | | 224/542 |
| 2007/0283855 | A1 | 12/2007 | Pozzi | |
| 2012/0181195 | A1* | 7/2012 | Lu | A45C 13/34 |
| | | | | 206/320 |
| 2013/0043148 | A1* | 2/2013 | Chen | B65D 61/00 |
| | | | | 206/45.23 |
| 2013/0146482 | A1* | 6/2013 | Huang | A47B 23/043 |
| | | | | 206/45.23 |
| 2013/0264459 | A1* | 10/2013 | McCosh | F16M 13/00 |
| | | | | 248/688 |
| 2014/0253024 | A1* | 9/2014 | Rautiainen | G06F 1/26 |
| | | | | 320/108 |
| 2014/0272041 | A1* | 9/2014 | McAninch | A23B 4/12 |
| | | | | 426/326 |
| 2014/0292041 | A1* | 10/2014 | Horowitz | A47C 7/626 |
| | | | | 297/35 |
| 2015/0069099 | A1* | 3/2015 | Diebel | B65B 5/04 |
| | | | | 224/196 |
| 2015/0084589 | A1* | 3/2015 | Tsai | G06F 1/26 |
| | | | | 320/108 |
| 2015/0305459 | A1* | 10/2015 | Lee | A45C 11/00 |
| | | | | 224/577 |
| 2018/0178700 | A1* | 6/2018 | Welch | B60N 3/102 |
| 2021/0101683 | A1* | 4/2021 | Williamson | B64D 11/0638 |
| 2021/0107409 | A1* | 4/2021 | Salvia, III | B60R 11/00 |
| 2021/0276466 | A1* | 9/2021 | Ketels | B60N 3/103 |
| 2022/0281386 | A1* | 9/2022 | Rhee | B60R 7/04 |

* cited by examiner

VEHICLE INTERIOR ASSEMBLY WITH FOLDABLE DEVICE HOLDER

TECHNICAL FIELD

The present disclosure is related generally to vehicle interiors and, more particularly, to multi-functional assemblies for use in vehicle interiors.

BACKGROUND

With the advent of portable electronic devices such as smartphones and tablet computers, vehicle manufacturers and aftermarket accessory manufacturers have been tasked with accommodating consumer desire to conveniently interact with or otherwise use such devices while driving or riding in vehicles. While a plethora of mobile phone holders have been marketed for use in vehicles, they are generally clunky and unattractive—e.g., clipped or clamped on to air vents, adhesively attached to expensive vehicle interior surfaces, or attached via suction cups to a glass surface in the vehicle. Even if these types of in-vehicle device holders were better integrated as part of the aesthetic design of a vehicle interior, they primarily serve occupants of the front row of seating and have generally been limited to relatively small portable electronics, such as smartphones.

U.S. Pat. No. 10,086,732 to Welch, et al. proposes tray tables for use in the back seat of a vehicle. The tray tables are stowed in a center armrest assembly that pivots about a horizontal axis from an upright position to a horizontal position. From there, each tray table slides forward from a stowed position to a ready position and then pivots about a vertical axis from the ready position, which is alongside a seat occupant, to a table position across the front of the seat occupant. Each table is formed in two halves that unfold from one another in a manner said to accommodate an electronic device between the outer edges of the halves via unspecified retaining mechanisms. The Welch design is problematic, however, with no teachings regarding retention of electronic devices or to the utility of the tray tables in general. For instance, each table must pivot from the ready position to the table position through the same space a seat occupant occupies—i.e., the intended user of each table cannot move the table to its usable positions or to its stowed position while sitting in the seat where the table is intended for use.

SUMMARY

In accordance with various embodiments, a vehicle interior assembly includes a foldable layer configured to support a portable electronic device in a tilted position when in a folded condition in which the foldable layer includes a plurality of folds along non-parallel axes.

In various embodiments, the foldable layer is configured to support the portable electronic device at a plurality of different locations over a base layer when in the folded condition so that a front face of the device is directed in a different horizontal direction at each of the locations.

In various embodiments, the foldable layer is configured to support the portable electronic device at a first location over a base layer and to simultaneously support another portable electronic device at a second location over the base layer when in the folded condition so that a front face of each device is directed in a different horizontal direction than the other.

In various embodiments, the different horizontal directions have opposite transverse components.

In various embodiments, the assembly includes a base layer configured to support one side of the portable electronic device when the foldable layer is in the folded condition and supporting another side of the device.

In various embodiments, the assembly includes a base layer having an edge support configured to support the portable electronic device when the foldable layer is in the folded condition and supporting a back side of the device. The edge support is covered by the foldable layer when the foldable layer is in an unfolded condition.

In various embodiments, the assembly includes a base layer. The foldable layer overlies the base layer and is convertible between an unfolded condition and a folded condition. A portion of the base layer is covered by the foldable layer in the unfolded condition, and the same portion of the base layer is uncovered by the foldable layer in the folded condition.

In various embodiments, the foldable layer has a foldable portion and a non-foldable portion that together form a planar working surface when the foldable layer is in an unfolded condition.

In various embodiments, the foldable layer includes a pair of planar surfaces that share an edge and are symmetric with respect to a longitudinal axis. The assembly also includes a base layer having a pair of grooves. Each groove is parallel with a bottom edge of a corresponding one of the planar surfaces.

In various embodiments, the foldable layer includes a plurality of segments that are interconnected by hinge joints. At least one pair of the segments are reversibly attached together at a non-visible location when the foldable layer is in the folded condition.

In various embodiments, the assembly is configured to charge the supported electronic device.

In various embodiments, the assembly includes a tray that includes the foldable layer. The tray is attached to a console base comprising a closable storage volume that is thermally insulated.

In various embodiments, the assembly includes a cup holder.

In various embodiments, the assembly includes a longitudinal vertical divider along a top side of a console base.

In various embodiments, the assembly includes is manually installable and removable from a vehicle interior and includes a handle for lifting and carrying the assembly.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Figure 2:
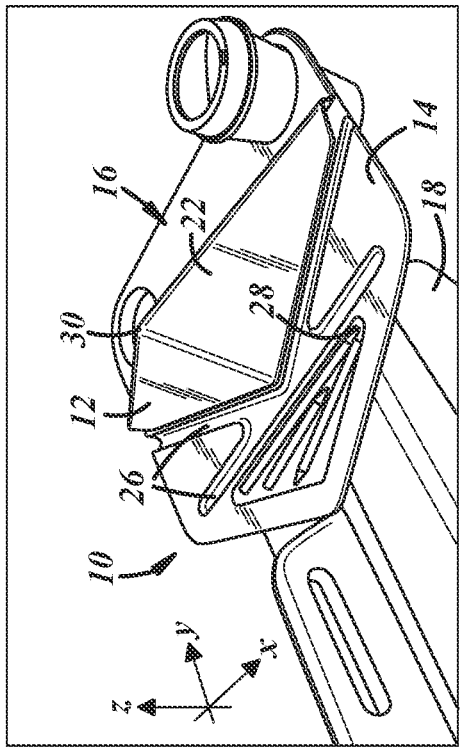
FIG. 2 is the console of FIG. 1 with the foldable layer in a folded condition, in which a holder for a portable electronic device is provided.

Described below is a vehicle interior assembly primarily for use in a secondary row of vehicle seating. A portion of the assembly is convertible from a tabletop to an electronic device holder and back in a manner that is both simple and aesthetically pleasing without the need for complex armatures, joints, or bearings pivoting, rotating, or sliding in multiple directions as part of the conversion. The convertible element may be part of a center console configured with family use in mind while also accommodating the needs of the individuals using the console.

FIGS. 1-4 are perspective views of an embodiment of a vehicle interior assembly 10 with a foldable layer 12. The illustrated example is a center console 10 installed in a vehicle interior in a secondary row of seating—i.e., in a row rearward of the row where the vehicle operator is normally seated. The foldable layer 12 is manually convertible between an unfolded condition (FIG. 1) and a folded condition (FIG. 2) and overlies a base layer 14 of the assembly 10 in both conditions. The foldable layer 12 and the underlying base layer 14 together form a tray 16 that is attached along a top side of a console base 18. The tray 16 provides a tabletop with a working surface 20 when the foldable layer 12 is in the unfolded condition, and a holder 22 for a portable electronic device 24 when the foldable layer is in the folded condition.

Stated another way, the assembly 10 includes a tray 16 with a holder 22 for a portable electronic device 24, the holder being convertible from a stowed configuration (FIG. 1), in which the foldable layer 12 is unfolded, and a deployed configuration (FIG. 2), in which the foldable layer is folded. This differs from conventional stowable vehicle components for passenger use in that such components are usually folded to be stowed and unfolded when deployed for use.

Figure 4:
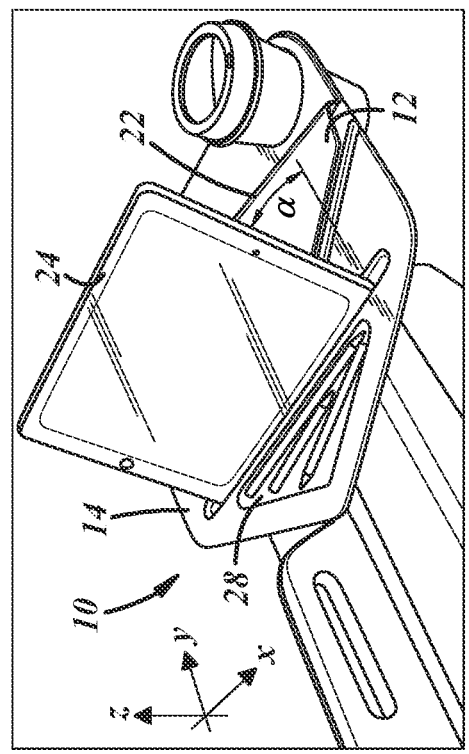
FIG. 4 is the vehicle interior assembly of FIG. 3 with the foldable layer supporting the electronic device at a different location.
Figure 1:
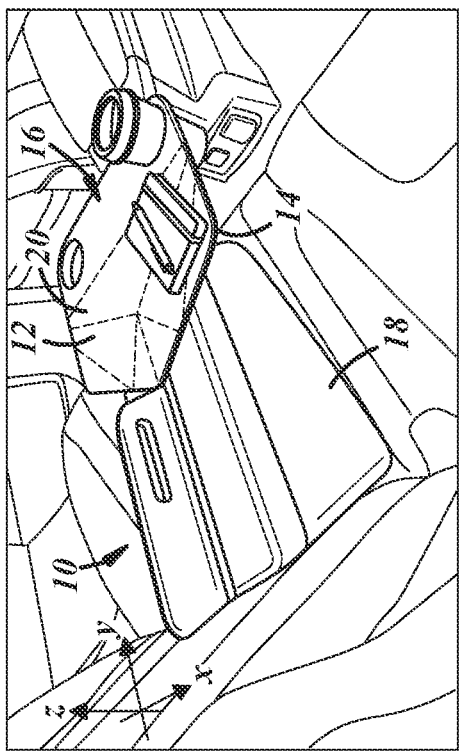
FIG. 1 is a perspective view of a center console with a foldable layer in an unfolded condition, in which a planar working surface is provided.
Figure 3:
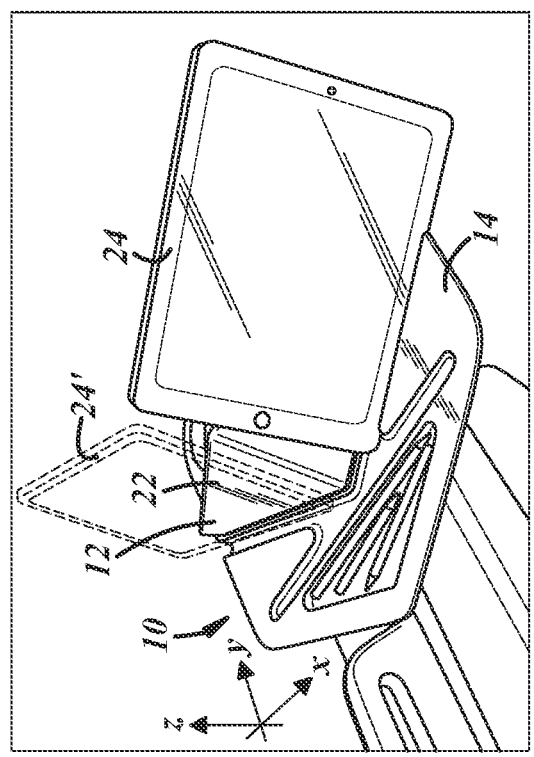
FIG. 3 is the vehicle interior assembly of FIG. 2 with the foldable layer supporting an electronic device.

When deployed, the holder 22 is configured to support a portable electronic device 24 in a tilted position—i.e., with a front face of the device tilted upward—as in FIGS. 3 and 4. A plane of the front face of the device 24 may form an angle ($\alpha$) between 30 and 75 degrees with a horizontal (XY) plane when supported by the holder 22. The angle ($\alpha$) is preferably between 45 and 60 degrees.

The holder 22 may also be configured to support the device 24 in tilted positions at a plurality of different locations over the base layer 14. For example, FIG. 3 illustrates the device 24 at a first location where the front face of the device is directed in a first horizontal direction, and FIG. 4 illustrates the device at a second location where the front face of the device is directed in a second and different horizontal direction. As used here, the "horizontal direction" of a tilted device 24 is in reference to the horizontal (XY) component of a surface normal of the front face of the device. In FIG. 3, the front face of the device 24 is thus directed in a horizontal direction that is both rearward (−Y) and toward the right side (+X) of the vehicle. In FIG. 4, the front face of the device 24 is directed in a different horizontal direction that is rearward (−Y). The amount of tilt ($\alpha$) of the device 24 does not affect the horizontal direction in which the front face of the device is directed.

The same holder 22 may be configured to support a plurality of portable electronic devices 24, 24' at a corresponding plurality of different locations. FIG. 3 illustrates a second device 24' in broken lines at a different location and facing in a different horizontal direction than the first device 24. The horizontal directions of the first and second devices 24, 24' of FIG. 3 have equal rearward components (−Y) and equal but opposite transverse components (±X). In this manner, the holder 22 can be used to support two different devices with each device facing a different passenger in the same row of seating. The same holder 22 can be used to support a single device 24 facing a passenger seated on the left or right side of the assembly 10. And the same holder 22 can be used to support a single rear facing device 24 (FIG. 4) such that two different passengers seated on opposite left and right sides of the assembly can view or otherwise use the same device.

In addition to the foldable layer 12 in the folded condition, the holder 22 includes a portion of the base layer 14. As shown in FIGS. 3 and 4, the folded layer 12 supports one side (i.e., a back side) of each device 24, while the base layer 14 supports another different side (i.e., a bottom side) of each device. The base layer 14 may include one or more edge supports 26 for supporting the portion of each device 24 that is in contact with the base layer in a stable position to prevent the tilted device from sliding down the folded layer 12.

The illustrated edge supports 26 (FIG. 3) are in the form of grooves or slots formed in the top surface of the base layer 14. Each groove 26 is formed in a different lengthwise direction with respect to each other. In this case, the base layer 14 includes a transversely (X) oriented groove 26 and a pair of angled grooves 26 located along edges of the folded layer 12. The respective orientations of the edge supports 26 define the different horizontal directions in which the front face of the device(s) 24 can be oriented on the holder 22. For example, the horizontal direction in which the device 24 of FIG. 3 faces is perpendicular to the lengthwise direction of the corresponding edge support 26.

The illustrated edge supports 26 intersect at a transverse center of the base layer 14 and of the assembly 10, and each edge support is sized to fit the desired electronic device. Here, the devices 24 are tablet computers, and each groove 26 is configured to support at least half the length of the longest side of the illustrated tablets. The transverse groove 26 may thus be at least 12 inches in length to accommodate most modern tablet computers, and each angled groove may be at least 6 inches in length to extend past the center of the supported device. The illustrated transverse groove 26 is formed entirely within the perimeter of the base layer 14, while the angled grooves extend all the way to the perimeter of the base layer so that an end of the device 24 can be placed outside the perimeter of the base layer and/or holder 22 as in FIG. 3. In some embodiments, the base layer 14 includes a transverse groove or other edge support 26 that extends all the way between transverse opposite sides of its perimeter. The base layer 14 may also include an elastomeric or other high-friction material along a portion of each edge support that contacts the device 24 when on the holder 22.

As is apparent in FIGS. 1-4, the edge supports 26 may be covered by the foldable layer 12 when in the unfolded condition and uncovered when in the folded condition. That is, no part of the holder 22 is deployed when the foldable layer is in the folded condition. The base layer 14 may also include one or more additional grooves and/or recesses 28 that do not function as part of the device holder 22. In this example, the base layer 14 includes a triangular recess 28 along its top surface that forms a closeable storage volume that can accommodate writing utensils or other personal items. The storage volume formed by the illustrated recess 28 is closed when the foldable layer 12 is in the unfolded condition and open when the foldable layer is in the folded condition. The foldable layer 12 does not have to be in the fully folded condition of FIGS. 2-4 to access this hidden storage volume.

In this particular example, the foldable layer 12 is flat in the unfolded condition so that the working surface 20 is planar, and the foldable layer forms a multi-sided, hollow, and self-supporting 3D structure in the folded condition. The shape of the illustrated 3D structure is pyramid-like and characterized by multiple planar surfaces intersecting at an apex 30 and along multiple lines, all of which form oblique angles with the illustrated coordinate system. To be foldable into the illustrated shape, the foldable layer 12 includes a plurality of fold lines or axes (shown in broken lines in FIG. 1) along which portions of the foldable layer 12 are hinged with respect to each other to be folded toward each other.

Figure 5:
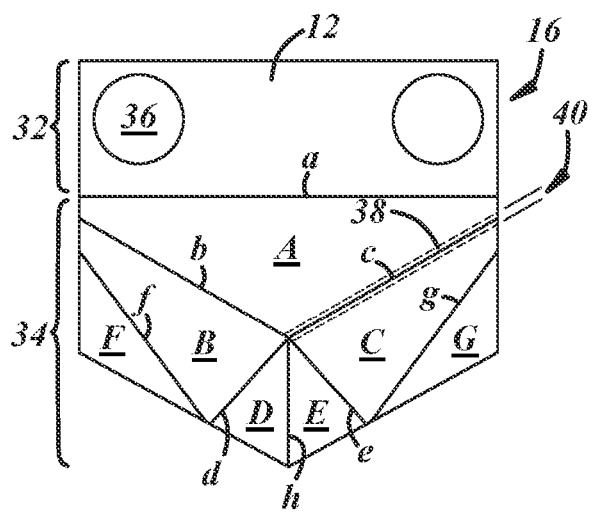
FIG. 5 is a plan view of the foldable layer of the console.

FIG. 5 is a plan view of the tray 16 of FIGS. 1-4 with the foldable layer 12 in the unfolded condition. The rounded corners of the tray 16 are omitted for the sake of simplicity. The foldable layer 12 includes a non-foldable portion 32 and a foldable portion 34 separated by a transverse folding axis (a). These two portions 32, 34 together form the planar work surface 20 of FIG. 1. The non-foldable portion 32 is permanently attached to the underlying base layer 14. Openings 36 formed through both layers of the tray 16 can be used as cup holders as in FIGS. 1-4. In another embodiment, the foldable layer 12 includes only a foldable portion.

The foldable portion 34 includes a plurality of polygonal segments A-G each having at least one side connected to a side of a different segment via a hinge joint 38. Only one hinge joint 38 is labeled in FIG. 5 for simplicity. Each hinge joint 38 lies along a corresponding folding axis (a-h) and permits one rotational degree of freedom of the adjacent segments thereabout. Each segment may include a relatively rigid portion (e.g., a plastic or metal plate), and each hinge joint may be formed from a relatively flexible material spanning a gap between adjacent rigid portions. In one embodiment, planar plastic pieces in the shape of segments A-G are arranged in the pattern of FIG. 5 with a gap 40 between opposing edges or sides of adjacent pieces and are sandwiched between top and bottom flexible layers (e.g., fabric or polymeric film) to form the foldable layer 12. The flexible layers can be sewn or heat-sealed together along the gaps 40 to form the hinge joints 38 and thereby define the folding axes (a-h).

Segments A-C become the three planar faces of the pyramid-like structure of the holder 22 of FIG. 2 when the foldable layer 12 is in the folded condition, with segment A being a tilted longitudinal (Y) facing segment and segments B and C being the faces of the structure that are in contact with and support the portable electronic device(s) when the holder is in use as in FIG. 3. Segments D and E are positioned face-to-face when the holder 22 is deployed and are folded to a location within the perimeter of the base of the 3D structure to support the three exposed faces A-C. Segments F and G are folded under the 3D structure when the holder 22 is deployed.

The transition from the unfolded condition to the folded condition is origami-like in that the foldable layer 12 is formed as one continuous layer with sides of the various segments interconnected such that, when one segment is folded relative to another, the orientation of other segments is affected. The folded layer 12 also includes hidden folds and segments when in the folded condition, and multiple folding axes intersect at a common point where the apex will be formed. The resulting 3D structure is symmetric and aesthetically pleasing with its multiple oblique fold lines and distinct angular characteristics.

Figure 6:
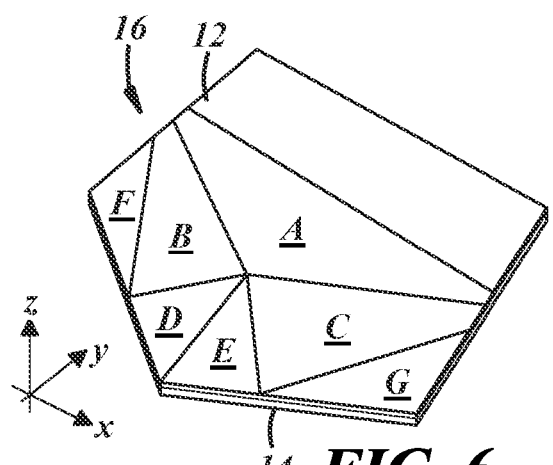
FIG. 6 is a perspective view of a tray of the console, including a base layer and the foldable layer in the unfolded condition.

FIGS. 6-10 are perspective views of the tray 16 with the foldable layer 12 in various configurations between the unfolded condition and the folded condition. FIG. 6 shows the foldable layer 12 in the unfolded condition and covering the entire top side of the underlying base layer 14. All of the segments A-G lie in the same horizontal plane. The folding axes between adjacent segments A-G of the foldable layer are shown as solid lines here but may be made less visible when a top layer of the foldable layer is formed from a continuous sheet of flexible material as discussed above.

Figure 7:
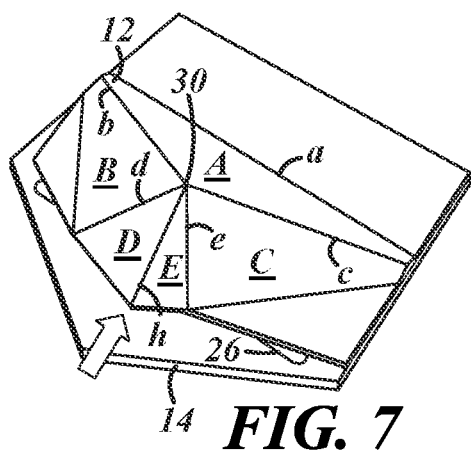
FIG. 7 is the tray of FIG. 6 illustrating the foldable layer during conversion to the folded condition.

FIG. 7 illustrates movement of segments D and E in the longitudinal (Y) direction to uncover a portion of the underlying base layer 14 and begin deployment of the device holder 22. This movement causes segment A to tilt upward about the transverse folding axis (a), which in-turn causes segments B and C to pivot about the folding axes (b, c) along the corresponding hinge joints joining them to segment A. This also causes segments D and E to fold toward one another about axis (h), and a portion of one of the grooves 26 of the base layer is uncovered. In origami terms, valley folds are formed along folding axis (a) and folding axis (h), while mountain folds are formed along folding axes (b), (c), (d), and (e). The pyramid-like 3D structure begins to rise above the base layer 14, and the apex 30 emerges at the intersection of the folding axes (b), (c), (d), (e), and (h).

Figure 8:
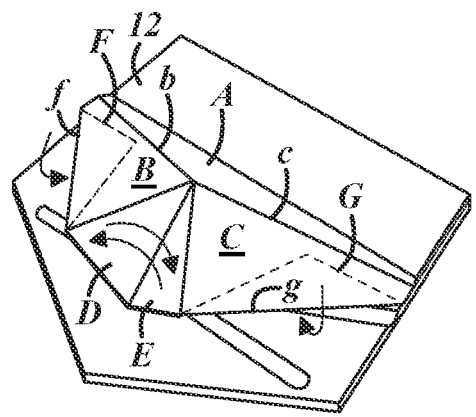
FIG. 8 is the tray of FIG. 7 with the foldable layer changed further toward the folded condition.

In FIG. 8, the edges of the foldable layer 12 within the perimeter of the base layer 14 are raised slightly via the transverse hinge joint, and segments F and G are folded behind segments B and C via mountain folds along axes (f) and (g), which uncovers more of the grooves 26 in the base layer 14.

Figure 9:
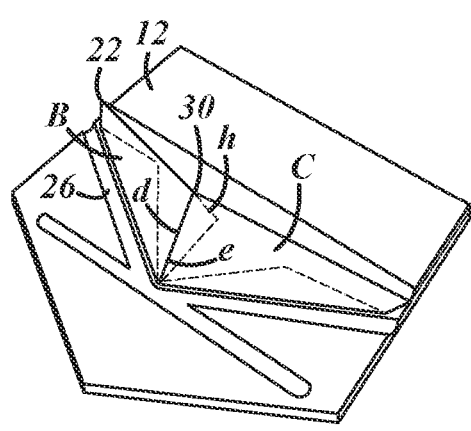
FIG. 9 is the tray of FIG. 8 with the foldable layer in the folded condition.

Segments D and E are then folded further toward each other until they oppose each other, face-to-face. This causes segments B and C to fold further about the axes (b) and (c) that they share with segment A, and it causes folding axes (d) and (e) to be brought together with folding axis (h) rotated about the apex 30 such that the hinge joint along the folding axis (h) is located within the perimeter of the base of the resulting pyramid-like structure, as shown in FIG. 9. Segments that are brought together with the foldable layer 12 in the folded condition, such as segments D and E, may be reversibly attached together to lock the structure in place. In one embodiment, at least one segment includes a magnet to hold it together with another segment that includes a magnet or a ferromagnetic material. Other reversible attachments are possible, such as snap fasteners or hook-and-loop fasteners. Magnetic attachment may be preferred because it can be made non-visible in the deployed holder. In the illustrated example, magnetic materials can be made part of segments D and/or E, for instance.

In the deployed holder 22, the foldable layer 12 is in a shape that includes a pair of tilted planar surfaces (corresponding to segments B and C) that share an edge (along axes (d) and (e)) and are symmetric with respect to a longitudinal (Y) axis. The bottom edges of segments B and C (i.e., the hinge joints along folding axes (f) and (g)) are in a horizontal plane on top of the base layer 14 and are parallel with the angled grooves 26 of the base layer. The foldable layer 12 includes a plurality of folds along non-parallel axes to provide a unique three-dimensional shape and a hollow, self-supporting structure with one portion of the foldable layer (segments D and E) supporting another portion of the foldable layer (segments B and C) over the base layer 14 in their tilted orientations. These supported portions (B, C) in-turn support the third wall (segment A) of the pyramid-like structure.

Figure 10:
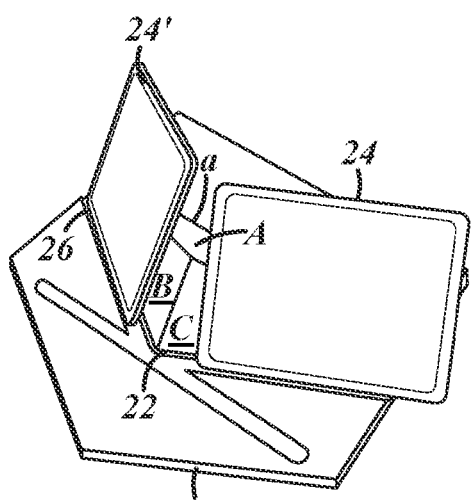
FIG. 10 is the tray of FIG. 9 with the deployed device holder in use to support a pair of devices.

FIG. 10 shows the deployed holder 22 supporting a pair of portable electronic devices 24, 24' with the angled grooves 26 as edge supports and segments B and C as back supports for the devices. With the weight of the device(s) leaning against the supporting segments B and C, segment A provides additional support with its folding axis (a) anchored in a fixed position relative to the base layer 14. The foldable layer 12 can be converted back to its unfolded condition with the devices removed from the holder 22 by moving the bottom edges of segments B and C in the opposition longitudinal direction and unfolding segments F and G from therebeneath.

Figure 11:
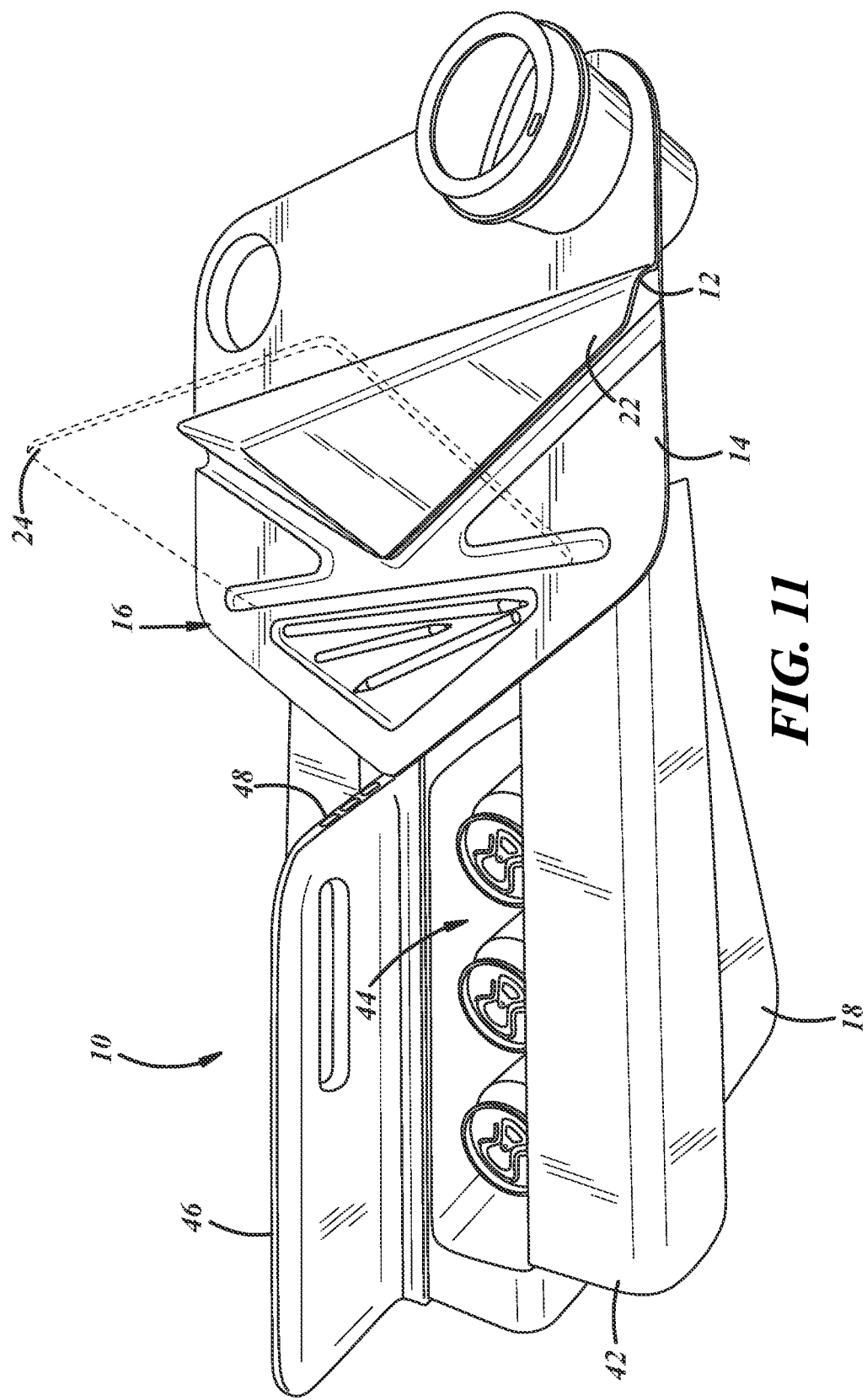
FIG. 11 is a perspective view of the console illustrating a closable storage volume, a divider, a handle, and charging ports.

FIG. 11 is a perspective view of the assembly 10 illustrating several additional features. In the illustrated embodiment, the tray 16, including the base layer 14 and the foldable layer 12, is attached to a forward portion of the top side of the console base 18. This forward positioning of the convertible tray 16 facilitates viewing of the same electronic device 24 by two different passengers seated on transversely opposite sides of the assembly. It also provides room for a substantially horizontal surface on the base 18 for the seated passengers to use as an armrest.

In the illustrated example, a pair of armrests 42 are movably attached to the console base 18 to partly define a closable storage volume 44 in the console base. Walls of the console base 18 surrounding the closable storage volume 44 may be thermally insulated to accommodate storage of beverages or food that need to be kept hot or cold for extended periods. Thermal insulation may include foam materials, such as polyurethane or EPS. The armrests 42 may include one or more thermally insulating layers as well.

The assembly 10 may also include a physical divider 46 that divides the top side of the console base 18 into separate left and right sides. In ride share situations, this allows two different passengers to use the armrests 42 without touching one another. The divider 46 can optionally function as a privacy screen when made sufficiently tall. In this example, the divider 46 is mounted along the top side of the console base 18, between the armrests 42 and rearward of the convertible tray 16, and extends in vertical (Z) and longitudinal (Y) directions.

The assembly 10 can also be configured to charge the supported electronic device or another electronic device. In the example of FIG. 11, charging ports 48 are included along a front side of the divider 46. Some charging ports (e.g., USB ports) can also provide connectivity to other vehicle systems, such as a vehicle audio system or entertainment system. In other embodiments, portions of the deployed holder 22 against which the mobile devices sometimes rest can include a wireless charger in one or more segments, such as segments B and C (FIGS. 5-10).

The assembly 10 can also be configured to be installable and removable from the vehicle interior. In the examples in the figures, the assembly 10 is a center console that is positioned in a center seating area of a secondary row of seating. The console 10 can be configured to be supported by the horizontal and vertical seating surfaces of the center seating area and removably attached thereto. A forward portion of the console base 18 may include a hook or clamp to grasp a forward edge of the center seat, for example. Or a dock for the console base 18 to be removably snapped into can be attached atop the desired seating area via a seatbelt or other suitable means. In one embodiment, the console 10 is configured for attachment to child safety seat anchors in the seat, representing an unexpected additional use for such anchors. Such a dock may include electrical contacts to facilitate easy connection and disconnection of powered features of the console 10 (e.g., charging ports or a thermoelectric cooler). When made removable from the vehicle interior, the console 10 can be carried to destinations away from the vehicle (e.g., a beach or park) for continued use as a tabletop, electronic device holder, and/or food storage container. In the illustrated example, the divider 46 doubles as a handle configured to lift and carry the console 10.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle interior assembly in the form of a vehicle interior console, the assembly comprising:

a console base and a tray attached along a top side of the console base, the tray including a base layer and a foldable layer that overlies the base layer and is convertible between an unfolded condition, in which a portion of the base layer is covered by the foldable layer, and a folded condition, in which said portion of the base layer is uncovered by the foldable layer, wherein the foldable layer is configured to support a portable electronic device in a tilted position when in the folded condition, wherein the foldable layer includes a plurality of folds along non-parallel axes when in the folded condition, wherein the tray provides a planar working surface over the console base when the foldable layer is in the unfolded condition, and a holder for the portable electronic device when the foldable layer is in the folded condition, and wherein the base layer supports a bottom side of the portable electronic device when the device is placed on the holder, and the foldable layer supports a back side of the portable electronic device when the device is placed on the holder.

2. The assembly of claim 1, wherein the foldable layer is configured to support the portable electronic device at a plurality of different locations over the base layer when in the folded condition so that a front face of the device is directed in a different horizontal direction at each of the locations.

3. The assembly of claim 1, wherein the foldable layer is configured to support the portable electronic device at a first location over the base layer and to simultaneously support another portable electronic device at a second location over the base layer when in the folded condition so that a front face of each device is directed in a different horizontal direction than the other.

4. The assembly of claim 3, wherein the different horizontal directions have opposite transverse components.

5. The assembly of claim 1, the base layer having an edge support configured to support the bottom side of the portable electronic device when the foldable layer is in the folded condition and supporting the back side of the device, wherein the edge support is covered by the foldable layer when the foldable layer is in the unfolded condition.

6. The assembly of claim 1, wherein the foldable layer has a foldable portion and a non-foldable portion that together form the planar working surface when the foldable layer is in the unfolded condition.

7. The assembly of claim 1, wherein the foldable layer includes a pair of planar surfaces that share an edge and are symmetric with respect to a longitudinal axis of the assembly, the base layer having a pair of grooves, each groove being parallel with a bottom edge of a corresponding one of the planar surfaces.

8. The assembly of claim 1, wherein the foldable layer includes a plurality of segments that are interconnected by hinge joints, at least one pair of the segments being reversibly attached together at a non-visible location when the foldable layer is in the folded condition.

9. The assembly of claim 1, wherein the assembly is configured to charge the supported electronic device.

10. The assembly of claim 1, the console base comprising a closable storage volume.

11. The assembly of claim 1, further comprising a cup holder formed through the tray.

12. The assembly of claim 1, further comprising a longitudinal vertical divider along the top side of the console base.

13. The assembly of claim 1, wherein the assembly is manually installable and removable from a vehicle interior and comprises a handle for lifting and carrying the assembly.

14. The assembly of claim 1, wherein the base layer is not folded when the foldable layer is in the folded condition.

15. The assembly of claim 1, wherein the base layer remains stationary with respect to the console base while the foldable layer is changed between the folded and unfolded conditions.

16. The assembly of claim 5, wherein the back side of the portable electronic device rests against a planar surface of the foldable layer when the foldable layer is in the folded condition and when the bottom side of the portable electronic device is placed on the edge support.

17. A vehicle interior assembly in the form of a vehicle console, comprising:
    a console base; and
    a tray attached along a top side of the console base, the tray including:
        a base layer at a fixed location with respect to the console base, and
        a foldable layer attached to the base layer and having a folded condition and an unfolded condition, the foldable layer having a plurality of folds along non-parallel axes in the folded condition,
    wherein the foldable layer is configured to support a portable electronic device in a tilted position at a plurality of different locations over the base layer when in the folded condition so that a front face of the device is directed in a different horizontal direction at each of the locations.

18. The assembly of claim 17, the base layer further comprising a plurality of edge supports, wherein a respective orientation of each edge support defines each different horizontal direction when the portable electronic device is being supported by the assembly with the device in contact with one of the edge supports.

19. A vehicle interior assembly in the form of a vehicle console, comprising:
    a console base; and
    a tray attached along a top side of the console base, the tray including:
        a base layer at a fixed location with respect to the console base, and
        a foldable layer attached to the base layer and having a folded condition and an unfolded condition, the foldable layer having a plurality of folds along non-parallel axes in the folded condition,
    wherein the foldable layer is configured to support a portable electronic device at a first location over the base layer and to simultaneously support another portable electronic device at a second location over the base layer when in the folded condition so that a front face of each device is directed in a different horizontal direction and away from the other.

20. The assembly of claim 19, the base layer further comprising a plurality of edge supports, wherein a respective orientation of each edge support defines each different horizontal direction when the portable electronic devices are being supported by the assembly with each device in contact with one of the edge supports.

* * * * *